US 7,075,744 B2

(12) United States Patent
Cumpson et al.

(10) Patent No.: US 7,075,744 B2
(45) Date of Patent: Jul. 11, 2006

(54) METHOD AND APPARATUS FOR MANAGING POWER CONSUMPTION OF A DISK DRIVE

(75) Inventors: Stephen Rodney Cumpson, Eindhoven (NL); Nicolaas Lambert, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/526,872

(22) PCT Filed: Aug. 8, 2003

(86) PCT No.: PCT/IB03/03632

§ 371 (c)(1),
(2), (4) Date: Mar. 4, 2005

(87) PCT Pub. No.: WO2004/023279

PCT Pub. Date: Mar. 18, 2004

(65) Prior Publication Data

US 2005/0251696 A1    Nov. 10, 2005

(30) Foreign Application Priority Data

Sep. 9, 2002    (EP)    .................................. 02078655

(51) Int. Cl.
G11B 19/02    (2006.01)
(52) U.S. Cl. ....................... 360/73.03; 360/69; 713/323
(58) Field of Classification Search .................... None
See application file for complete search history.

(56) References Cited

U.S. PATENT DOCUMENTS

| 4,984,103 | A |   | 1/1991 | Nigam ......................... 360/69 |
| 5,493,670 | A |   | 2/1996 | Douglis et al. ........... 360/73.03 |
| 5,574,920 | A |   | 11/1996 | Parry |
| 5,682,273 | A |   | 10/1997 | Hetzler ..................... 360/73.03 |
| 5,943,307 | A | * | 8/1999 | Takagi et al. ............. 369/47.33 |
| 6,092,209 | A |   | 7/2000 | Holzhammer et al. |
| 6,161,187 | A |   | 12/2000 | Mason et al. |
| 6,553,501 | B1 | * | 4/2003 | Yokoe ......................... 713/320 |
| 6,590,730 | B1 | * | 7/2003 | Veltchev et al. ............... 360/69 |
| 6,892,313 | B1 | * | 5/2005 | Codilian et al. ............ 713/323 |
| 6,928,039 | B1 | * | 8/2005 | Millikan et al. .......... 369/47.33 |
| 6,958,960 | B1 | * | 10/2005 | Sasaki ...................... 369/47.28 |
| 6,987,635 | B1 | * | 1/2006 | Akagi et al. ................... 360/69 |

(Continued)

FOREIGN PATENT DOCUMENTS

| GB | 2347531 A | 9/2000 |
| WO | WO 96/10249 | 4/1996 |

OTHER PUBLICATIONS

New Releases, Home Cinema Choice, Sep. 2002, pp. 30-31.

*Primary Examiner*—K. Wong
*Assistant Examiner*—James L Habermehl

(57)    ABSTRACT

A method and apparatus for managing power consumption of consumer electronic devices that run on a battery or an accumulator, particularly portable applications such as mobile phones, laptops or MPEG players or recorders. They consist essentially of a host and a storage medium like a disk or means for receiving a storage medium like a disk drive that are coupled with an interface. Power management is very important because long battery life enhances user convenience. The invention determines whether it is more efficient either to leave the disk drive in the idle mode or to switch the drive to standby until the next data request appears. The disk drive is entered into the most efficient power mode. The time until the next request is determined by the host.

9 Claims, 6 Drawing Sheets

U.S. PATENT DOCUMENTS

2003/0067847 A1* 4/2003 Silvester .................. 369/30.23
2004/0015731 A1* 1/2004 Chu et al. .................. 713/300
2004/0081045 A1* 4/2004 Won et al. ................ 369/47.33
2005/0216674 A1* 9/2005 Robbin et al. .............. 711/138

* cited by examiner

METHOD AND APPARATUS FOR MANAGING POWER CONSUMPTION OF A DISK DRIVE

The invention relates to a method of managing power consumption of a disk drive comprised by an electronic device, the electronic device further comprising a buffer memory and a host processor, the disk drive comprising a disk comprising data, and the disk drive being capable of operating in at least two operating modes, the two modes having different power consumption levels, the method comprising the step of loading data requested by the host processor from the disk into the buffer in a first operating mode of the disk drive having a first power consumption level.

The invention further relates to a circuit for managing the power consumption of a disk drive comprised by an electronic device, the electronic device further comprising a buffer memory and a host processor, the disk drive comprising a disk comprising data; and the disk drive being capable of operating in at least two operating modes, the two modes having different power consumption levels, the host processor being conceived to load data from the disk into the buffer in a first operating mode of the disk drive having a first power consumption level.

Such a method is known from U.S. Pat. No. 5,682,273. This document refers to disk drives used in portable computers that are battery-powered. In particular, it relates to such disk drives that include techniques for minimizing energy consumption. U.S. Pat. No. 5,682,273 discloses a disk drive that performs power management from past disk drive access history as well as a prediction of future user demands to determine the entry and exit times of the power saving modes. This has an advantage over the current user-selectable predetermined or fixed mode entry times because the user does not know what performance and energy-consumption costs are associated with entry and exit from power saving modes. In U.S. Pat. No. 5,682,273, the time intervals for entering a power saving mode are computed on the basis of the energy break-even times and recovery times associated with the different power saving modes as explained above.

The disk drive of U.S. Pat. No. 5,682,273 attempts to forecast when the next request will occur. This forecast, however, can be faulty because the hard disk must power up prematurely if the next request appears earlier. This takes time, which is not calculated, and activity in a real-time streaming consumer electronics application is disturbed or data may be lost. All of the prior art described above may be classified as systems wherein the drive attempts to predict when the following drive request will be received with varying degrees of success.

Furthermore, further hard disk systems are known from practice. Modem hard disk systems have an option to actively put the hard disk system in one or more power save modes. This is especially advantageous for portable devices like laptop computers. However, additional power is consumed when putting the hard disk system in a power save mode and getting the hard disk system out of the power save mode when data is requested or needs to be written. This has to be taken into account when putting the drive in a power save mode.

It is an object of the invention to provide an improved method of managing the power consumption of the disk drive.

This object is achieved by the method according to the invention, and is characterised in that that the method further comprises the following steps: determining a period of time until the data read into the buffer in the previous step is processed;

determining a first amount of power that will be consumed by the disk drive during the period of time when the disk drive is left in the first operating mode during said period of time; determining a second amount of power that will be consumed by the disk drive: during the period of time when the disk drive is entered into the second operating mode having a second level of power consumption, the second level of power consumption being lower than the first level of power consumption; while switching from the first operating mode to the second operating mode; while switching from the second operating mode to the first operating mode; and the step of entering the disk drive into the second operating mode when the second amount of power is less than the first amount of power.

The host processor controls the processes of the electronic apparatus and therefore knows the data needs of the host. In this way, the host processor knows when all data in the buffer memory has been processed and when new data is needed. With this information and the information on what amount of power is consumed when switching from the first operating mode to the second operating mode and vice versa, calculations can be made whether it is advantageous to switch to the second operating mode or not. Letting this process be controlled by the host processor instead of by the disk drive is advantageous because the host does know the data requirements of the electronic apparatus and therefore knows when data will be requested. This makes prediction obsolete and is more reliable.

An embodiment of the invention is characterized in that the data request comprises a request for multiple files.

Requesting multiple files and reading them all at once in the buffer memory is advantageous because buffer memory is filled up to a higher level than when only one file is read. In this way, more time will elapse before new data is needed from the disk and more power can be saved.

The circuit according to the invention is characterized in that the host processor is further conceived to: determine a period of time until the data in the buffer memory is processed; determine a first amount of power that will be consumed by the disk drive during the period of time when the disk drive is left in the first operating mode during said period of time; determine a second amount of power that will be consumed by the disk drive: during the period of time when the disk drive is entered into the second operating mode having a second level of power consumption, the second level of power consumption being lower than the first level of power consumption; while switching from the first operating mode to the second operating mode; while switching from the second operating mode to the first operating mode; and is conceived to enter the disk drive into the second operating mode when the second amount of power is less than the first amount of power.

The objects and the advantages of the present invention will become more readily apparent to those ordinarily skilled in the art after reviewing the following detailed description and accompanying drawings, wherein.

Figure 1:
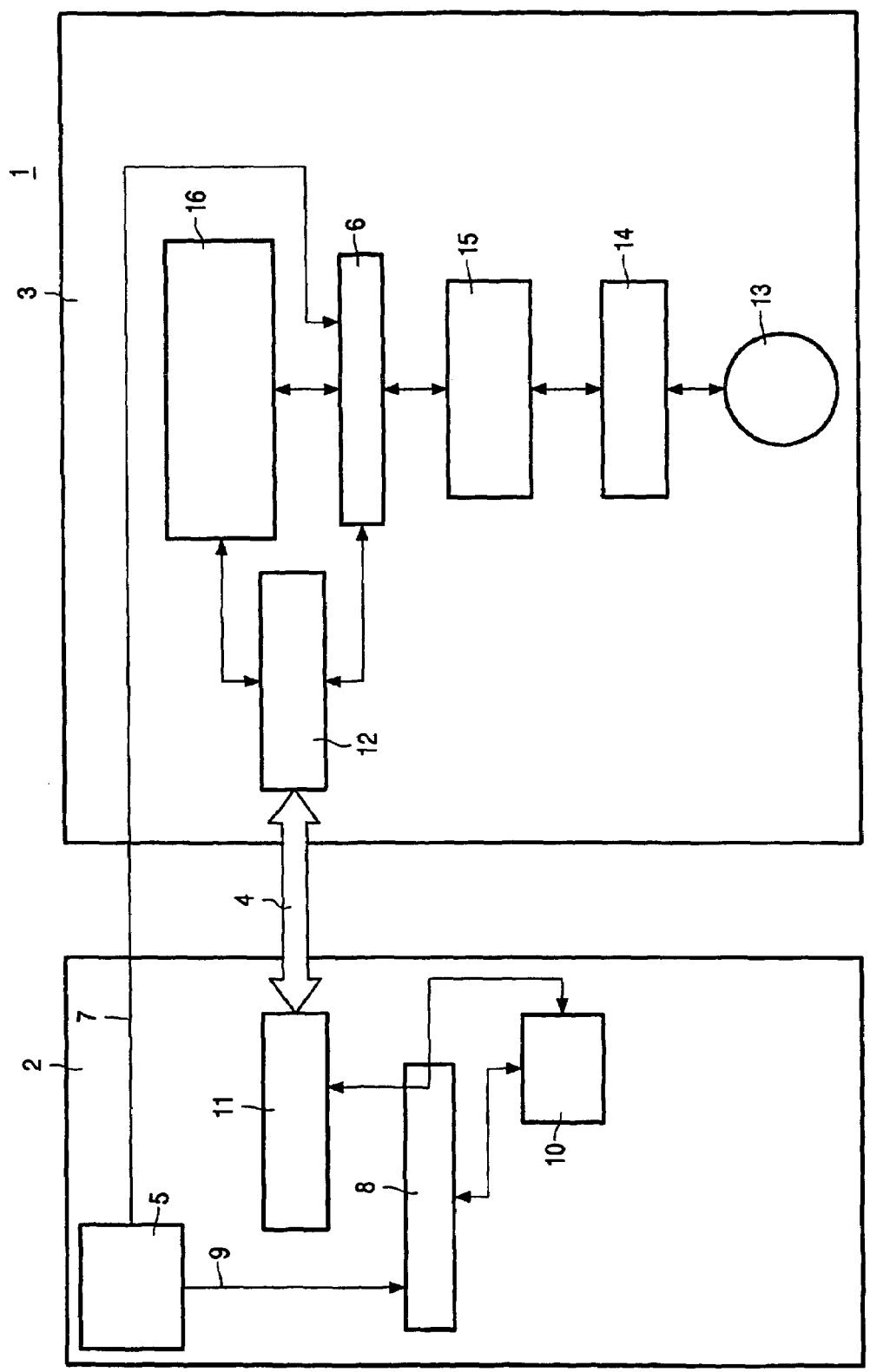
FIG. 1 is a block diagram showing an embodiment of the circuit according to the invention and a disk drive system.

Referring to the drawings more particularly, FIG. 1 shows a block diagram with the various elements for the power reduction of a consumer electronics system 1. The consumer electronics system 1 comprises a host 2 and a disk drive system 3 that are connected by an interface 4. In this embodiment, the power source 5 belongs to the host 2 and supplies the microcontroller 6 in the storage system 3 via a bus 7. The power source 5 also supplies the microprocessor 8 via another bus 9.

Any operation begins in the host 2. When the host 2 becomes aware that a data transfer is required to or from the storage system 3, a region of host RAM 10 is reserved for the data transfer. The host 2 then sets up a table in the DMA (Direct Memory Access) controller 11 describing the host memory region that was reserved. The final host operation is to inform the storage system 3 of the requested data operation using a standard protocol over the interface 4.

DMA controller 12 of the storage system 3 handles the communication with the host 2. The storage system 3 attempts to perform the required data transfer in the shortest possible time and ensures that the data is read from or written to the reserved memory region of host RAM 10. In the disk drive system 3, the information is stored on a magnetic disk 13. The signal is read by using a corresponding head and amplified by the pre-amplifier 14. The read/write channel 15 processes the signals so that the risk of an error is minimized.

The microcontroller 6 in the storage system 3 controls a servo-system (not shown) controlling the head and ensures that data is correctly transmitted and received over the common interface 4. The microcontroller 6 also uses buffering to improve average performance using a RAM 16. Finally, the microcontroller is also responsible for correcting any data errors as much as possible. The host 2 may be a general purpose computer or an embedded system, such as a consumer electronics device. The host 2 uses the storage system 3 to preserve information across power removal.

Figure 2:
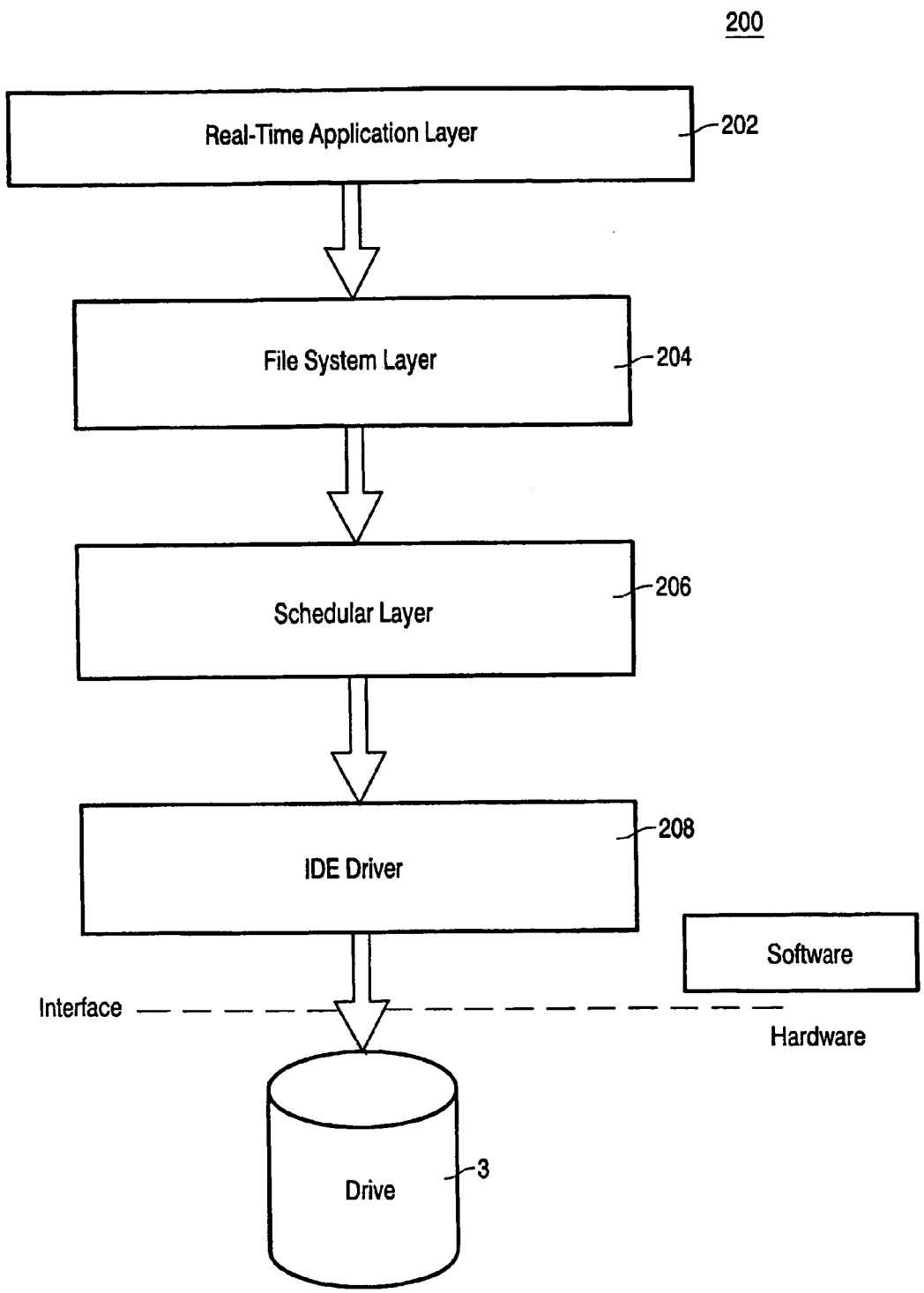
FIG. 2 is an overview of the system showing the drive, the interface and the software running on the host system.

FIG. 2 is an overview of the system showing the disk drive system 3 and a software stack 200 running on the host system 2. The software comprises a real-time application layer 202, a file system layer 204, a scheduler layer 206 and an IDE (integrated drive electronics interface) driver 208. The decision to change power modes is made in the software-based request scheduler layer running in the memory on the processor of the host 2. For optimal power-performance trade-off, the scheduler layer 206 has the property of being ware of both real-time data requirements and power usage.

Figure 3:
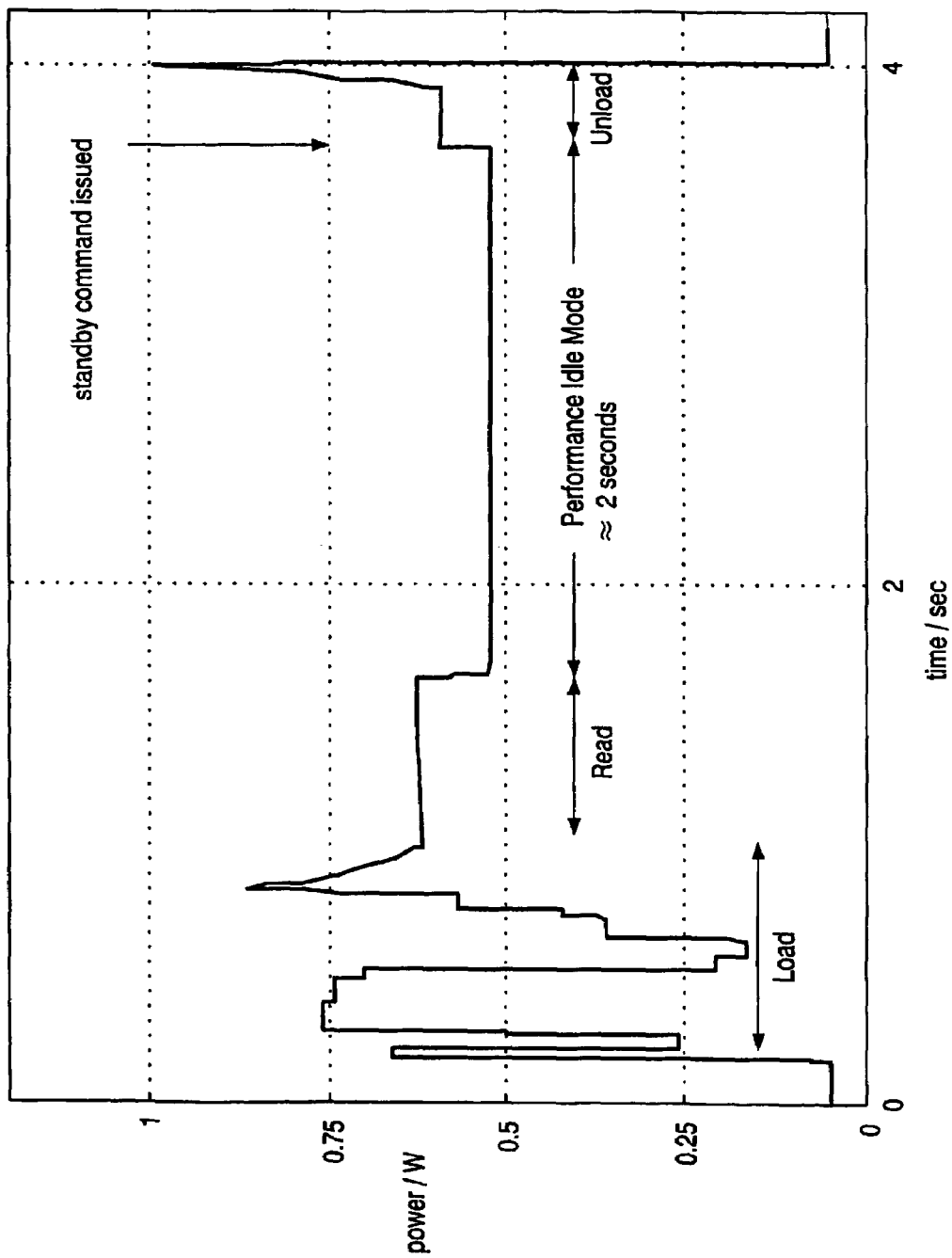
FIG. 3 is a diagram showing the power consumption of a prior-art hard disk drive.

FIG. 3 shows the power trace measured on a microdrive that uses a prior art method for managing the power consumption. The trace begins and ends with the power consumption in the standby mode. After a few milliseconds, the microdrive exits the standby mode and the power trace for loading and reading is drawn. According to the prior art, the microdrive then remains fully active in a so-called performance idle mode, which means that the drive can respond immediately to the next incoming request. The trace shows that spinning the disk still draws quite a lot of energy from the power supply. In this example of the prior art, the standby command is issued internally in the disk drive after 2 seconds. When the internal standby command is issued, the unloading process begins and afterwards the standby mode is reached. In this example, the standby mode corresponds to approximately 0.06 W.

Figure 4:
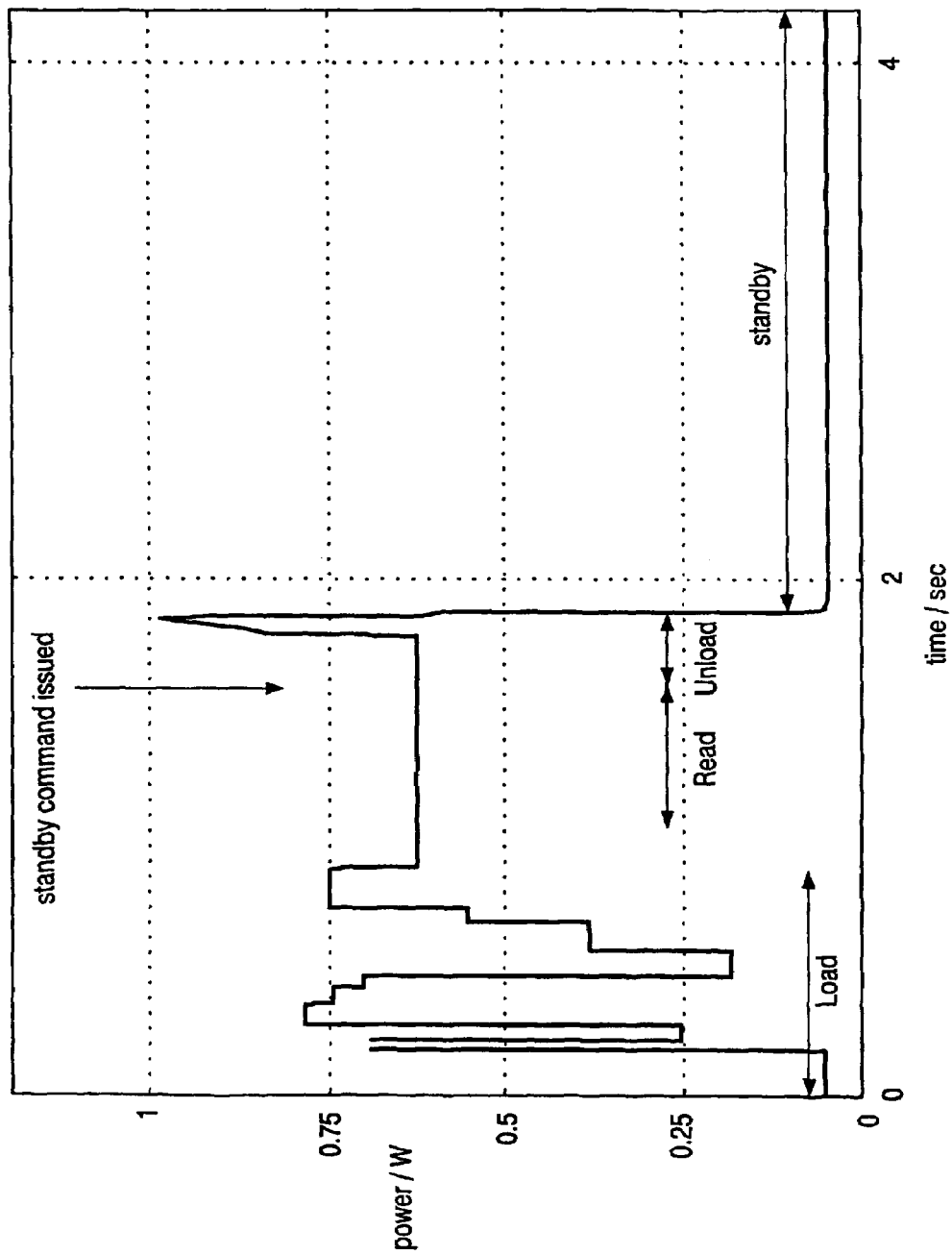
FIG. 4 is a diagram showing the power consumption of a hard disk drive according to the invention.

Contrary to the power trace shown in FIG. 3, the power trace of FIG. 4 shows much less power consumption for the same processes. Again, the power trace begins in the standby mode that is exited for the loading and reading process. Immediately after finishing the current request—this example is a reading request—the standby command is issued and the unloading process is executed immediately after the reading process. This results in a much earlier switch of the standby mode. The loading, the reading and the unloading processes themselves consume the same power, either with the prior art method or the inventive method. Therefore, putting the drive in the standby mode for a too short period may take more energy than keeping it in the idle mode when a data request is received too soon by the drive. However, it becomes apparent that power consumption is much less if the storage system, in this example the microdrive, does not wait in an active performance idle mode before entering the standby mode.

Figure 5:
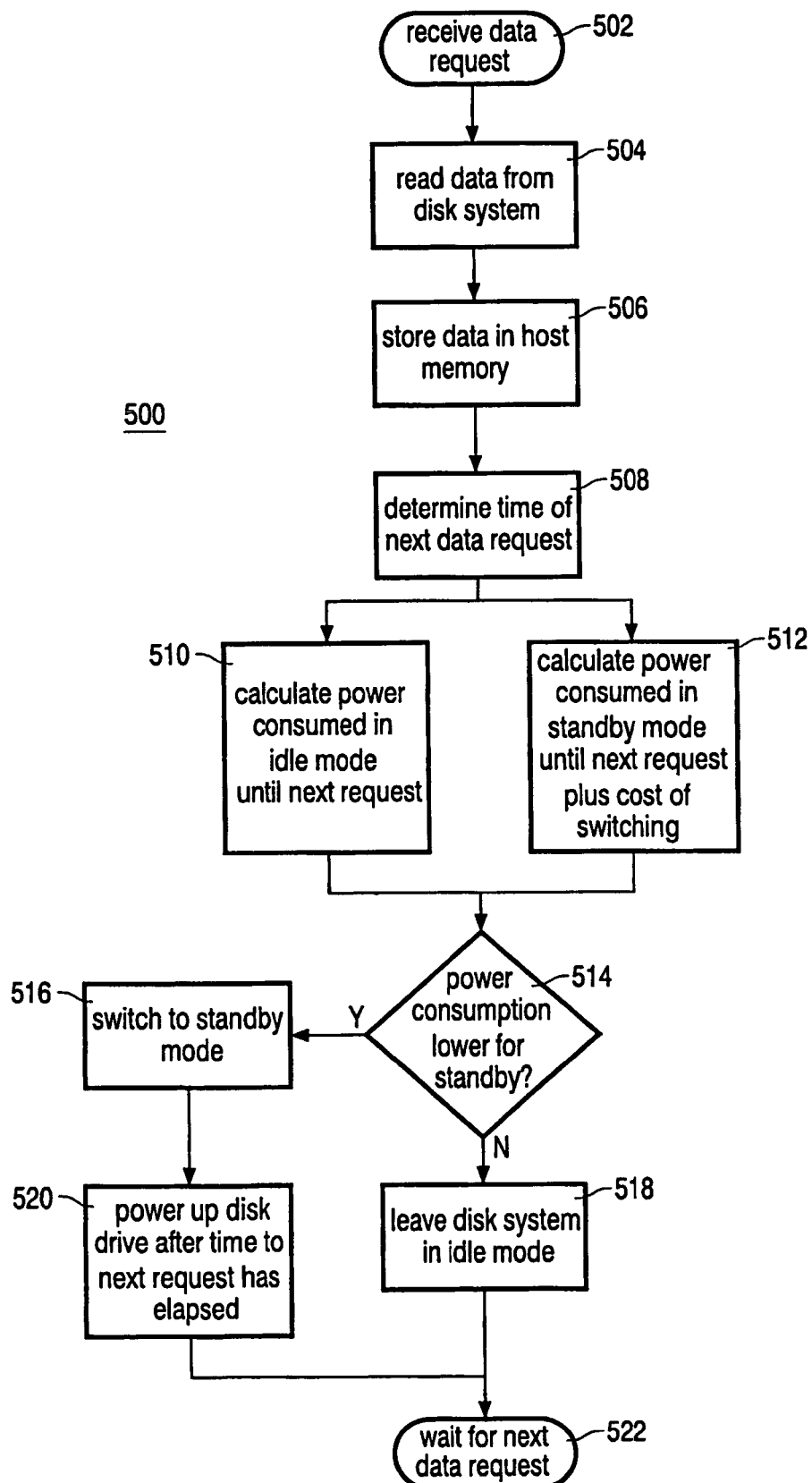
FIG. 5 is a flowchart showing an embodiment of the method according to the invention.

A procedure to calculate whether to enter the disk drive system 3 in a standby mode after a data request or not is depicted in FIG. 5, showing a flowchart 500 to visualize an embodiment of the method according to the invention. The procedure starts at a starting point 502 by the reception of a data request. Subsequently, in a step 504, the host 2 reads data from the disk drive system 3. The data read from the disk drive system 3 is stored in the host 2 in the host RAM 10 in a subsequent step 506. In the next step 508, the microprocessor 8 determines the period of time to lapse until the microcontroller needs more data and a subsequent request for data is issued.

Especially when streaming data, for example an MP3 file, from the disk drive system 3 to the host 2, the need for data is known over time. This may be used advantageously by calculating whether the drive system 3 should be put in the power down mode or should be left in the idle mode to save most energy.

In a preferred embodiment of the invention, this is done by determining the data rate of processing the requested data. When the requested data is an MP3 file, the data is streamed from the host RAM 10 at a continuous bit rate. When the amount of data in the host RAM 10 is known, as well as the bit rate of processing, it is known how much time it will take until the data in the host RAM is processed and a subsequent request for data is issued.

In the next step 510, the micro-controller 8 calculates the amount of power that will be consumed in the period of time determined in the previous step 508 by the disk drive system 3 when the disk drive system 3 is put in the standby mode during the period of time determined in the previous step 508. The power consumed during unloading and loading the head and spinning the disk down and up are added to this value, because these actions have to be performed as well when switching the disk drive system 3 in the standby mode. Consequently, the amount of power calculated in the step 510 equals the power consumed in the periods "load", "unload" and "standby" in FIG. 4.

In the step 512, the micro-controller calculates the amount of power that will be consumed by the disk drive system 3 in the period of time determined in the step 508 when the disk drive system 3 is left idle in the period of time determined in the step 508.

In the decision 514, the values determined in the step 510 and the step 512 are compared. Depending on the outcome, the disk drive system 3 is set to the standby mode when the amount of power determined in the step 510 is larger than the amount of power determined in the step 512. When the amount of power determined in the step 510 is less than the amount of power determined in the step 512, the disk drive system 3 is left in the idle mode. In other words, the disk drive system 3 is set to or left in the most efficient mode.

When the procedure has branched to the step 516 and the disk drive system 3 has been set to the standby mode, the procedure proceeds to a step 520 to power up the disk drive system 3 right before the next data request is expected. In this way, no valuable time is consumed by starting up the disk drive system 3 when the actual request arrives: in this way, the request can be served directly when it arrives at the expected time.

When the step 520 is omitted in the procedure, the disk has to be spun up at the moment of the request, which will be done automatically. As mentioned, this will provide a delay in the data transfer.

The procedure ends in a terminator 522, waiting for the next data request.

The procedure is most effective when as much data as possible is read in the step 504, because this will mean that more time will lapse until the next data request occurs. In this way, the drive system 3 can be put to standby for a longer time. Therefore, it is most efficient to read multiple files in one read step.

The procedure may be executed by the circuit according to the invention, of which the host 2 is an embodiment.

Figure 6:
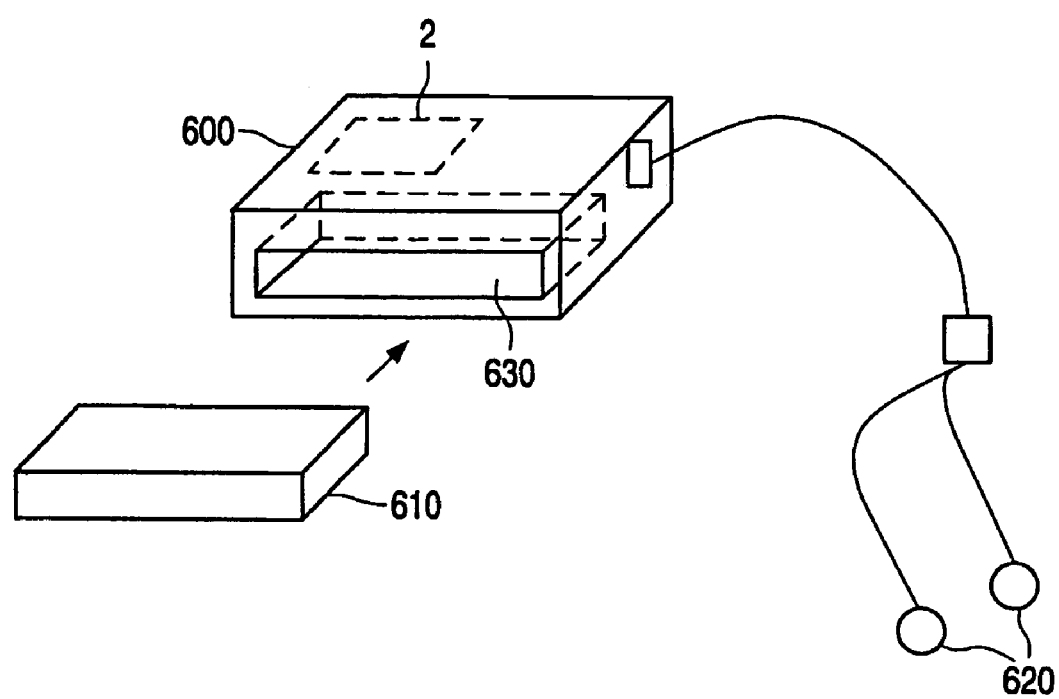
FIG. 6 shows an embodiment of the apparatus according to the invention.

The host 2 may be comprised in a consumer electronics apparatus 600 as shown in FIG. 6. A preferred embodiment of the apparatus according to the invention is a portable MP3 player. The consumer apparatus 600 comprises the host 2 (FIG. 1) and means for receiving a computer-readable disk memory 610. In the presented embodiment of the apparatus according to the invention, the computer-readable disk memory 610 is a hard disk drive in the Compact Flash format, known as a microdrive, which can be inserted in a slot 630. However, in a further embodiment, the computer-readable disk memory 610 is a small form factor optical disc. The person skilled in the art can also name numerous other embodiments like various types of harddisk drives and optical discs; the scope of the invention is not limited to the computer-readable disk memory 610 as presented in this description of the preferred embodiments of the invention. Connected to the apparatus 600 is a pair of headphones 620 to listen to audio information stored on the computer readable disk memory 610.

The invention may be summarized as follows:

Consumer electronic devices that run on a battery or an accumulator—i.e particularly portable applications such as mobile phones, laptops or MPEG players or recorders—require the management of power consumption. They consist essentially of a host and a storage medium like a disk or means for receiving a storage medium like a disk drive that are coupled with an interface. Power management is very important because long battery life enhances user convenience. According to the invention, it is determined whether it is more efficient either to leave the disk drive in the idle mode or to switch the drive to standby until the next data request appears. The disk-drive is entered into the most efficient power mode. The time until the next request is determined by the host.

The invention claimed is:

1. A method of managing power consumption of a disk drive (3) comprised by an electronic device (600), the electronic device further comprising a buffer memory (10) and a host processor (8);

the disk drive comprising a disk memory (13) comprising data; and the disk drive being capable of operating in at least two operating modes, the two modes having different power consumption levels, the method comprising the step of loading data requested by the host processor from the disk into the buffer in a first operating mode of the disk drive having a first power consumption level;

characterized in that the method further comprises the following steps:

a) determining a period of time to lapse from the moment the data requested is loaded into the buffer until the data read into the buffer in the previous step is processed;

b) determining a first amount of power that will be consumed by the disk drive during the period of time when the disk drive is left in the first operating mode during said period of time;

c) determining a second amount of power that will be consumed by the disk drive:

i.) during the period of time when the disk drive is entered into the second operating mode having a second level of power consumption, the second level of power consumption being lower than the first level of power consumption;

ii.) for switching from the first operating mode to the second operating mode;

iii.) for switching from the second operating mode to the first operating mode; and d) entering the disk drive into the second operating mode when the second amount of power is less than the first amount of power.

2. A method as claimed in claim 1, wherein determining said period of time comprises the following steps:

a) determining a processing rate at which the host processes the data stored in the buffer b) determining an amount of data stored in the buffer c) multiplying the processing rate with the amount of data stored in the buffer.

3. A method as claimed in claim 1, wherein the data request comprises a request for multiple files.

4. A method as claimed in claim 2, wherein the requested data comprises at least a part of the stream of audiovisual data and the processing rate is the streaming rate of the stream of audiovisual data.

5. A method as claimed in claim 1, wherein the disk memory is an optical disc.

6. A method as claimed in claim 1, wherein the disk memory is a hard disk.

7. A method as claimed in claim 1, further comprising the step of switching from the second operating mode to the first operating mode when the period of time has elapsed.

8. A circuit (2) for managing the power consumption of a disk drive (3) comprised by an electronic device (600), the electronic device further comprising a buffer memory (10) and a host processor (8);

the disk drive comprising a disk (13) comprising data; and the disk drive being capable of operating in at least two operating modes, the two modes having different power consumption levels, the host processor being conceived to load data from the disk into the buffer in a first operating mode of the disk drive having a first power consumption level;

characterized in that the host processor is further conceived to:

a) determine a period of time until the data in the buffer memory is processed;
b) determine a first amount of power that will be consumed by the disk drive during the period of time when the disk drive is left in the first operating mode during said period of time;
c) determine a second amount of power that will be consumed by the disk drive:
   i.) during the period of time when the disk drive is entered into the second operating mode having a second level of power consumption, the second level of power consumption being lower than the first level of power consumption;
   ii.) while switching from the first operating mode to the second operating mode;
   iii.) while switching from the second operating mode to the first operating mode.
d) enter the disk drive into the second operating mode when the second amount of power is less than the first amount of power.

9. A consumer electronics device (600) comprising:
a) the circuit as claimed in claim 8; and
b) means for receiving a computer readable disk memory.

* * * * *